United States Patent
Morrison et al.

(10) Patent No.: US 6,828,358 B2
(45) Date of Patent: Dec. 7, 2004

(54) LIQUID INKS COMPRISING TREATED COLORANT PARTICLES

(75) Inventors: Eric D. Morrison, West St. Paul, MN (US); Wu Shyong Li, Woodbury, MN (US); Sang Woo Kim, Kangham-Gu (KR)

(73) Assignee: Samsung Electronics Co., Ltd., Suwon (KR)

( * ) Notice: Subject to any disclaimer, the term of this patent is extended or adjusted under 35 U.S.C. 154(b) by 99 days.

(21) Appl. No.: 10/010,926

(22) Filed: Nov. 9, 2001

(65) Prior Publication Data

US 2002/0086916 A1 Jul. 4, 2002

Related U.S. Application Data

(60) Provisional application No. 60/246,948, filed on Nov. 10, 2000.

(51) Int. Cl.[7] ............................ C09D 11/10; C08L 39/00
(52) U.S. Cl. ........................................ 523/160; 524/555
(58) Field of Search ................................. 523/160, 161; 524/448, 555, 548; 106/31.6, 31.85; 430/114, 137.22

(56) References Cited

U.S. PATENT DOCUMENTS

| | | | |
|---|---|---|---|
| 3,904,562 A | * 9/1975 | Hopfenberg et al. | ......... 523/200 |
| 4,061,582 A | 12/1977 | Moschovis et al. | ......... 252/62.1 |
| 4,360,580 A | * 11/1982 | Tsubuko et al. | ....... 430/137.17 |
| 4,663,265 A | * 5/1987 | Uytterhoeven et al. | ..... 430/114 |
| 4,665,011 A | 5/1987 | Padszum et al. | ............ 430/114 |
| 5,009,980 A | 4/1991 | El-Sayed et al. | ........... 430/114 |
| 5,290,653 A | 3/1994 | Pearlstine | .................... 430/114 |
| 5,358,822 A | * 10/1994 | Hou | ........................... 430/137 |
| 5,547,804 A | * 8/1996 | Nishizawa et al. | ......... 430/114 |
| 5,698,616 A | * 12/1997 | Baker et al. | ................. 523/201 |
| 5,760,257 A | 6/1998 | Tanaka et al. | ................. 554/36 |
| 5,953,566 A | 9/1999 | Fujiwara et al. | ............ 399/223 |
| 5,998,075 A | 12/1999 | Fujiwara et al. | ............ 430/106 |
| 6,120,957 A | 9/2000 | Miyamoto et al. | .......... 430/106 |
| 6,417,283 B1 | * 7/2002 | Ikeda et al. | ............. 525/362.1 |
| 2002/0128349 A1 | * 9/2002 | Qian et al. | ................... 523/160 |

* cited by examiner

Primary Examiner—Callie Shosho
(74) Attorney, Agent, or Firm—Mark A. Litman & Associates, P.A.

(57) ABSTRACT

A process of making a liquid ink comprising the steps of:
(a) dissolving a polymer comprising units derived from at least a nitrogen-containing polymerizable monomer in a solvent with a Kauri-Butanol number greater than 30 to form a polymer solution;
(b) dispersing colorant pigment particles in said polymer solution to form a colorant pigment dispersion;
(c) removing at least some of said solvent from said colorant pigment dispersion to form treated colorant pigment particles; and
(d) dispersing said treated colorant pigment particles in an organosol containing a carrier liquid having a Kauri-Butanol number less than 30.

7 Claims, No Drawings

LIQUID INKS COMPRISING TREATED COLORANT PARTICLES

RELATED APPLICATIONS

This application claims priority from U.S. Provisional Application Ser. No. 60/246,948 filed on 10 Nov. 2000.

BACKGROUND OF THE INVENTION

1. Field of the Invention

This invention relates to liquid ink compositions containing colorant pigment particles treated with a polymer comprising units derived from at least a nitrogen-containing polymerizable monomer. In particular, this invention relates to liquid ink which exhibits improved chargeability, reduced conductivity variability, and improved dispersion stability when used in any imaging process, including but not limited to ink transfer processes, ionographic, electrographic, and electrophotographic color printing or proofing processes.

2. Background of the Art

Liquid inks are widely used in a variety of imaging and printing processes, for example offset, bubble jet, ink jet, intaglio, rotogravure, ink jet, electrographic and electrophotographic printing. Many of the desired characteristics of the pigment dispersions used in the liquid inks are the same for each of the respective processes even though the final ink formulations may be substantially different. For example, the stability of the pigment dispersion on the shelf, under shear conditions, and under high voltage fields is an important consideration regardless of the final use of the liquid ink. The art continuously searches for more stable pigment dispersions to provide more flexibility in ink formulations, which in turn yields better efficiency and waste reduction in the various printing processes.

In electrophotographic applications, which includes devices such as photocopiers, laser printers, facsimile machines and the like, liquid inks are referred to as liquid toners or developers. Generally, the electrophotographic process includes the steps of forming a latent electrostatic image on a charged photoconductor by exposing the charged photoconductor to radiation in an imagewise pattern, developing the image by contacting the photoconductor with a liquid developer, and finally transferring the image to a receptor. The final transfer step may be performed either directly or indirectly through an intermediate transport member. The developed image is usually subjected to heat and/or pressure to permanently fuse the image to the receptor.

Liquid toners typically comprise an electrically insulating liquid that serves as a carrier for a dispersion of charged particles known as toner particles composed of a colorant (e.g., pigment or dye) and a polymeric binder. A charge director is often included as a component of the liquid developer in order to regulate the polarity and magnitude of the charge on the toner particles. Liquid toners can be categorized into two primary classes. For convenience, the two classes will be referred to as conventional liquid toners and organosol toners. Among these two classes of liquid toners, organosol toners are preferred in electrophotographic applications for their stability.

Stable organosols contain colloidal (0.1–1 micron diameter) particles of polymeric binder. The particles are typically synthesized by nonaqueous dispersion polymerization in a low dielectric hydrocarbon solvent. These organosol particles are sterically-stabilized with respect to aggregation by the use of a physically-adsorbed or chemically-grafted soluble polymer. The most commonly used non-aqueous dispersion polymerization method is a free radical polymerization carried out when one or more ethylenically-unsaturated (typically acrylic or methacrylic) monomers, soluble in a hydrocarbon medium, are polymerized in the presence of a preformed amphipathic polymer. The preformed amphipathic polymer, commonly referred to as the stabilizer, is comprised of two distinct units, one essentially insoluble in the hydrocarbon medium, the other freely soluble. When the polymerization process to manufacture the organosol particle proceeds to a fractional conversion of monomer corresponding to a critical molecular weight, the solubility limit of the polymer is exceeded and the polymer precipitates from solution, forming a "core" particle. The amphipathic polymer then either adsorbs onto or covalently bonds to the core, which core continues to grow as a discrete particle. The particles continue to grow until monomer is depleted, and the attached amphipathic polymer "shell" acts to sterically-stabilize the growing core particles with respect to aggregation. The resulting non-aqueous colloidal dispersion (organosol) comprises core/shell polymer particles with a number average diameter in the range 0.1–0.5 microns.

The resulting organosols can be subsequently converted to liquid toners by simple incorporation or mixing of the colorant pigment and a charge director, followed by high shear homogenization, ball-milling, attritor milling, high energy bead (sand) milling or other size reduction processes or mixing means known in the art for effecting particle size reduction in forming a dispersion. The input of mechanical energy to the dispersion during milling acts to break down pigment agglomerates into primary particles (0.05–1.0 micron diameter) and to "shred" the organosol into fragments that adhere to the newly-created pigment surface, thereby acting to sterically-stabilize the pigment particles with respect to aggregation. The result is a sterically-stabilized, charged, non-aqueous pigment dispersion having particles in the size range 0.1–2.0 microns number average diameter, with typical toner particle number average or weight average particle diameters between 0.1–0.5 microns. Such a sterically-stabilized dispersion is ideally suited for use in high resolution printing.

The charging of liquid inks is highly dependent upon the pigment used. The amount of charge director, also known as charge control agent, required for acceptable ink conductivity varies greatly among different colorant pigments and is designed into the ink according to known charge director design principles. Inks comprising different colorant pigments behave differently under printing conditions such as exposure to high electric fields. These variations, arising from the different charging characteristics of colorant pigments, are undesirable. There is also a concern about lot-to-lot variation of a colorant pigment, which might lead to undesirable variation in ink properties. Therefore, it is desirable to have ink conductivity and electrical properties independent of the type or lot of a colorant pigment. Furthermore, inks with lower levels of charge director, especially black ink that currently has a high level of charge director in the ink composition, is useful to decrease printed optical density and reduce overtoning problems such as tailing, washoff, and sludging (well known adverse influences in imaging processes). Previous attempts to increase the chargeability of inks (i.e. to prepare inks with sufficient conductivity at reduced charge director levels to provide effective imaging have either been ineffective to improve the chargeability or have resulted in undesirable effects such as high free phase conductivity. This term is defined in the section under toner conductivity and it is also a well know property in liquid electrophotograpy.

Lastly, most useful charge directors have a limited solubility in the low dielectric solvents suitable for electrophotographic liquid inks. As a result, the charge director aggregates as dispersed particles in the liquid or dispersed in the binder of the liquid ink. Consequently, there will be little direct physical contact or interaction between the colorant pigment and the charge director and ineffective ink transfer under electrostatically driven transfer processes.

There are some references known in the art to improve dispersion stability and charge characteristics of liquid inks. In U.S. Pat. No. 4,665,011, a liquid ink is described comprising a dispersed pigment and a block copolymer having a first block containing nitrogen-containing aromatic vinyl compounds and nitrogen-free aromatic vinyl compounds, an a second block containing polymerized $C_4$–$C_6$ dienes. The liquid ink is reported to have high dispersion stability and high charge stability.

In U.S. Pat. No. 5,009,980, an aromatic nitrogen-containing compound, which is substantially insoluble or immiscible in the non-polar liquid carrier, is dispersed in a thermoplastic binder as a charging adjuvant to form a liquid ink with improved image quality.

In U.S. Pat. No. 4,061,582, polyvinyl acetate is used as a binder as well as a coating on the surface of colorant pigment particles. The treated pigment particles require minimal miling to yield a stable liquid ink with improved oleophilic properties. However, there is no specific teaching of the use of nitrogen-containing polymer to surface-treated colorant pigments.

This invention provides a surface-treatment process consists of precipitating nitrogen-containing polymers in the presence of colorant pigments or of treating colorant pigments with a nitrogen-containing polymer solution and then drying the colorant pigments. The treated colorant pigments provide more highly charging liquid inks, inks with acceptable conductivity at a lower amount of charge control additive, and pigments with reduced lot to lot and manufacturer to manufacturer variation in charging properties.

SUMMARY OF THE INVENTION

In a first aspect, the invention features a process of making a liquid ink that includes (a) dissolving a polymer comprising units derived from at least a nitrogen-containing polymerizable monomer in a solvent with a Kauri-Butanol number greater than 30 to form a polymer solution; (b) dispersing colorant pigment particles in said polymer solution to form a colorant pigment dispersion; (c) removing at least some of the solvent from the colorant pigment dispersion to form treated colorant pigment particles; and (d) dispersing the treated colorant pigment particles in an organosol containing a carrier liquid having a Kauri-Butanol number less than 30.

In a second aspect, the invention features a process of making a liquid ink that includes (a) dissolving a polymer comprising units derived from at least a nitrogen-containing polymerizable monomer in a solvent with a Kauri-Butanol number greater than 30 to form a polymer solution; (b) dispersing colorant pigment particles in the polymer solution to form a colorant pigment dispersion; (c) precipitating treated colorant pigment particles from the colorant pigment dispersion; and (d) dispersing the treated colorant pigment particles in an organosol containing a carrier liquid having a Kauri-Butanol number less than 30.

In a third aspect, the invention features a liquid ink that includes (a) a carrier liquid having a Kauri-Butanol number less than 30; (b) an organosol; and (c) colorant pigment particles surface treated by a polymer comprising units derived from at least a nitrogen-containing polymerizable monomer.

The liquid inks of the present invention will be described with respect to electrophotographic office printing; however, it is to be understood that these liquid toners are not limited in their utility and may also be employed in printing or other ink transfer processes, such as high speed printing presses, photocopying apparatus, microfilm reproduction devices, facsimile printing, ink jet printer, instrument recording devices, and the like.

DETAILED DESCRIPTION OF THE INVENTION

A liquid ink composition is provided comprising a colorant pigment and an organosol dispersed in a liquid or liquid blend having a Kauri-Butanol (KB) number less than 30. The liquid ink composition is resistant to aggregation and sedimentation and is capable of rapidly film forming (rapid self-fixing), which is particularly useful in electrophotographic, ionographic or electrostatic imaging and other conventional printing processes.

The carrier liquid may be selected from a wide variety of materials that are known in the art, but preferably has a Kauri-Butanol number less than 30. The Kauri-Butanol Number(KB) is measured by the ASTM Test Method D1133-54T. It is a measure of the tolerance of a standard solution of kauri resin in 1-butanol to an added hydrocarbon diluent and is measured as the volume in milliliters (mL) at 25° C. of the solvent required to produce a certain defined degree of turbidity when added to 20 g of a standard kauri-1-butanol solution. Standard values are toluene (KB=105) and 75% by volume of heptane with 25% by volume toluene (KB=40). The liquid is typically oleophilic, chemically stable under a variety of conditions, and electrically insulating. Electrically insulating refers to a liquid having a low dielectric constant and a high electrical resistivity. Preferably, the liquid has a dielectric constant of less than 5, more preferably less than 3. Electrical resistivities of carrier liquids are typically greater than $10^9$ Ohm-cm, more preferably greater than $10^{10}$ Ohm-cm. The carrier liquid preferably is also relatively non-viscous to allow movement of the charged particles during development, and sufficiently volatile to permit its timely removal from the final imaged substrate, but sufficiently non-volatile to minimize evaporative losses in the developer. In addition, the carrier liquid should be chemically inert with respect to the materials or equipment used in the liquid electrophotographic process, particularly the photoreceptor and its release surface.

Examples of suitable carrier liquids include aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons, and the like), silicone oils and blends of these solvents. Preferred carrier liquids include branched paraffinic solvent blends such as Isopar™ G, Isopar™ H, Isopar™ K, Isopar™ L, Isopar™ M and Isopar™ V (available from Exxon Corporation, N.J.), and most preferred carriers are the aliphatic hydrocarbon solvent blends such as Norpar™ 12, Norpar™ 13 and Norpar™ 15 (available from Exxon Corporation, N.J.).

The composition of the graft stabilizer is normally selected such that the Hildebrand Solubility Parameter of the graft stabilizer (shell) closely matches that of the carrier liquid in order to ensure that the stabilizer will be sufficiently solvated to dissolve in the carrier solvent. Virtually any polymerizable compound that exhibits a Hildebrand Solubility Parameter difference less than 3.0 MPa$^{1/2}$ relative to the carrier liquid may be used in forming a graft stabilizer. In addition, polymerizable compounds that exhibit a Hildebrand Solubility Parameter difference greater than 3.0 MPa$^{1/2}$ relative to the carrier liquid may be used in forming a copolymeric graft stabilizer, provided that the effective Hildebrand Solubility Parameter difference for the stabilizer is less than 3.0 MPal$^{1/2}$ relative to the carrier liquid. The absolute difference in Hildebrand Solubility Parameter between the graft stabilizer (shell) and the carrier liquid is preferably less than 2.6 MPal$^{1/2}$ Non-limiting examples of useful polymerizable compounds in forming the graft stabilizer are $C_6$–$C_{30}$ acrylic and methacrylic esters non-exclusively including 3,3,5-trimethylcyclohexyl methacrylate, hexyl acrylate, 2-ethylhexyl acrylate, decyl acrylate, dodecyl (lauryl) acrylate, octadecyl (stearyl) acrylate, behenyl acrylate, hexyl methacrylate, 2-ethylhexyl(methacrylate), decyl acrylate, dodecyl (lauryl) methacrylate, octadecyl (stearyl) methacrylate, isobornylacrylate, isobornylmethacrylate, and other acrylates and methacrylates which meet the solubility parameter requirements described above.

The graft stabilizer may be chemically bonded to the resin core (i.e., grafted to the core) or may be adsorbed onto the core such that it remains as an integral part of the resin core. Any number of reactions known to those skilled in the art may be used to effect grafting of the soluble polymeric stabilizer to the organosol core during free radical polymerization. Common grafting methods include random grafting of polyfunctional free radicals; ring-opening polymerizations of cyclic ethers, esters, amides or acetals; epoxidations; reactions of hydroxyl or amino chain transfer agents with terminally-unsaturated end groups; esterification reactions (i.e., glycidyl methacrylate undergoes tertiary-amine catalyzed esterification with methacrylic acid); and condensation reactions or polymerization. Preferred number average molecular weights of the graft stabilizer are from 50,000 to 1,000,000 Daltons (Da), more preferably from 100,000 to 500,000 Da, most preferably from 100,000 to 300,000 Da.

The polydispersity of the graft stabilizer also has an affect on imaging and transfer performance of the liquid toners. Generally, it is desirable to maintain the polydispersity (the ratio of the weight-average molecular weight to the number average molecular weight) of the graft stabilizer below 15, more preferably below 5, most preferably below 2.5.

A grafting technique to form grafting sites by incorporating hydroxyl groups into the graft stabilizer during a first free radical polymerization and catalytically reacting all or a portion of these hydroxyl groups with an ethylenically unsaturated aliphatic isocyanate (e.g., meta-isopropenyldimethylbenzyl isocyanate [TMI] or 2-cyanatoethylmethacrylate [IEM] to form a polyurethane linkage during a subsequent non-free radical reaction step. The graft stabilizer is then covalently bonded to the nascent insoluble acrylic (co)polymer core via reaction of the unsaturated vinyl group of the grafting site with ethylenically-unsaturated core monomers (e.g. vinyl esters, particularly acrylic and methacrylic esters with carbon numbers <7 or vinyl acetate; vinyl aromatics, such as styrene; acrylonitrile; n-vinyl pyrrolidone; vinyl chloride and vinylidene chloride) during a subsequent free radical polymerization step.

Other methods of effecting grafting of the preformed polymeric stabilizer to the incipient insoluble core particle are known to those skilled in the art. For example, alternative grafting protocols are described in sections 3.7–3.8 of Barrett *Dispersion Polymerization in Organic Media*, K. E. J. Barrett, ed., (John Wiley: New York, 1975), pp. 79–106. A particularly useful method for grafting the polymeric stabilizer to core utilizes an anchoring group. The function of the anchoring groups is to provide a covalent link between the core part of the particle and the soluble component of the steric stabilizer. Suitable monomers containing anchoring groups include: adducts of alkenylazlactone comonomers with an unsaturated nucleophile containing hydroxy, amino, or mercaptan groups, such as 2-hydroxyethylmethacrylate, 3-hydroxypropylmethacrylate, 2-hydroxyethylacrylate, pentaerythritol triacrylate, 4-hydroxybutyvinylether, 9-octadecen-1-ol, cinnamyl alcohol, allyl mercaptan, methallylamine; and azlactones, such as 2-alkenyl-4,4-dialkylazlactone of the structure:

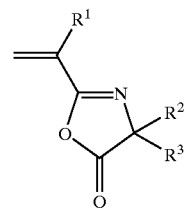

where $R^1$=H, or alkyl groups having 1 to 5 carbons, preferably one carbon, $R^2$ and $R^3$ are independently lower alkyl groups having 1 to 8 carbons, preferably 1 to 4 carbons.

Most preferably, however, the grafting mechanism is accomplished by grafting an ethylenically-unsaturated isocyanate (e.g., dimethyl-m-isopropenyl benzylisocyanate, available from American Cyanamid) to hydroxyl groups previously incorporated into the graft stabilizer precursor (i.e., hydroxy ethyl methacrylate).

The core polymer is made in situ by copolymerization with the stabilizer monomer. The composition of the insoluble resin core is preferentially manipulated such that the resin core exhibits a low glass transition temperature (Tg) to allows one to formulate an ink composition containing the resin as a major component to undergo rapid film formation (rapid self-fixing) in printing or imaging processes carried out at temperatures greater than the core Tg, preferably at or above 23° C. Rapid self-fixing assists in avoiding printing defects (such as smearing or trailing-edge trailing) and incomplete transfer in high speed printing. The core Tg of should be below 23° C., more preferably <10° C., most preferably <–10° C.

Non-limiting examples of polymerizable organic compounds suitable for use in the organosol core include monomers such as, methyl acrylate, ethyl acrylate, butyl acrylate, methyl methacrylate, ethyl methacrylate, butyl methacrylate, N,N-dimethylaminoethyl(meth)acrylate, N,N-diethyloethyl(meth)acrylate, N,N-dibutylaminoethyl(meth) acrylate, N,N-hydroxyethylaminoethyl(meth)acrylate, N-benzy,N-ethylaminoethyl(meth)acrylate, N,N-dibenzylaminoethyl (meth)acrylate, N-octyl,1N,N-dibexylaminoethyl(meth)acrylate, N-vinylimidazole, N-vinylindazole, N-vinyltetrazole, 2-vinylpyridine, 4-vinylpyridine, 2-methyl-5-vinylpyridine, 2-vinylquinoline, 4-vinylquinoline, 2-vinylpyrazine, 2-vinyloxazole, 2-vinylbenzooxazole and the like; N-vinylpyrrolidone, N-vinylpiperidone, N-vinyloxazolidone, (meth)acrylamides such as N-methylacrylamide, N-octylacrylamide, N-phenylmethacrylamide, N-cyclohexylacrylamide, N-phenylethylacrylamide, N-p-methoxyphenylacrylamride, acrylamide, N,N-dimethylacrylamide, N,N-dibutylacrylamide, N-methyl,N-phenylacrylamide, piperidine acrylate, morpholine acrylate, dimethlaminostyrene, diethylaminostyrene, diethylaminomethylstyrene, dioctylaminostyrene, vinyl-N-ethyl-N-phenylaminoethylether, vinyl-N-butyl-N-phenylaminoethylether, triethanolamine divinylether, vinyldiphenylaminoethylether, vinypyrrolizylaminoether, vinyl-.beta.-morpholinoethylether, N-vinylhydroxyethylbenzamide, m-aminophenylvinylether, and other acrylates and methacrylates, most preferred being methyl methacrylate, ethyl acrylate, and dimethylaminoethyl methacrylate.

Other polymers which may be used either alone or in conjunction with the aforementioned materials, include melamine and melamine formaldehyde resins, phenol formaldehyde resins, epoxy resins, polyester resins, styrene and styrene/acrylic copolymers, vinyl acetate and vinyl acetate/acrylic copolymers, acrylic and methacrylic esters, cellulose acetate and cellulose acetate-butyrate copolymers, and poly(vinyl butyral) copolymers. The optimal weight ratio of the resin core to the stabilizer shell is on the order of 1/1 to 15/1, preferably between 2/1 and 10/1, and most preferably between 4/1 and 8/1. Undesirable effects may accompany core/shell ratios selected outside of these ranges. For example, at high core/shell ratios (above 15), there may be insufficient graft stabilizer present to sterically-stabilize the organosol with respect to aggregation. At low core/shell ratios (below 1), the polymerization may have insufficient driving force to form a distinct particulate phase resulting in a copolymer solution, not a shelf-stable organosol dispersion.

The particle size of the organosols also influences the imaging, drying and transfer characteristics of the liquid inks. Preferably, the primary particle size (determined with dynamic light scattering) of the organosol is between about 0.05 and 5.0 microns, more preferably between 0.15 and 1 micron, most preferably between 0.20 and 0.50 microns.

A liquid ink utilizing the aforementioned organosol comprises colorant embedded in the thermoplastic organosol resin. Useful colorants are well known in the art and include materials such as dyes, stains, and pigments. Preferred colorants are pigments that may be incorporated into the polymer resin, are nominally insoluble in and nonreactive with the carrier liquid, and are useful and effective in making visible the latent electrostatic image. Non-limiting, examples of typically suitable colorants include: phthalocyanine blue (C.I. Pigment Blue 15:1, 15:2, 15:3 and 15:4), monoarylide yellow (C.I. Pigment Yellow 1, 3, 65, 73 and 74), diarylide yellow (C.I. Pigment Yellow 12, 13, 14, 17 and 83), arylamide (Hansa) yellow (C.I. Pigment Yellow 10, 97, 105 and 111), azo red (C.I. Pigment Red 3, 17, 22, 23, 38, 48:1, 48:2, 52:1, 81 and 179), quinacridone magenta (C.I. Pigment Red 122, 202 and 209) and black pigments such as finely divided carbon (Cabot Monarch 120, Cabot Regal 300R, Cabot Regal 350R, Vulcan X72) and the like.

The optimal weight ratio of resin to colorant in the toner particles is on the order of 1/1 to 20/1, preferably between 3/1 and 10/1 and most preferably between 5/1 and 8/1. The total dispersed material in the carrier liquid typically represents 0.5 to 70 weight percent, preferably between 1 and 25 weight percent, most preferably between 2 and 12 weight percent of the total liquid developer composition.

The colorant pigments can be surface-treated with a nitrogen-containing polymer or copolymer to improve the chargeability and reduced charge variation. Suitable nitrogen-containing polymers or copolymers contain nitrogen-containing polymerizable organic compounds which are selected from the group consisting of (meth)acrylates having aliphatic amino radicals such as N,N-dimethylaminoethyl(meth)acrylate, N,N-diethylaminoethyl(meth)acrylate, N,N-dibutylaminoethyl(meth)acrylate, N,N-hydroxyethylaminoethyl(meth)acrylate, N-benzyl,N-ethylaminoethyl(meth)acrylate, N,N-dibenzylaminoethyl(meth)acrylate, N-octyl,N,N-dihexylaminoethyl(meth)acrylate and the like; nitrogen containing heterocyclic vinyl monomers such as N-vinylimidazole, N-vinylindazole, N-vinyltetrazole, 2-vinylpyridine, 4-vinylpyridine, 2-methyl-5-vinylpyridine, 2-vinylquinoline, 4-vinylquinoline, 2-vinylpyrazine, 2-vinyloxazole, 2-vinylbenzooxazole and the like; N-vinyl substituted ring-like amide monomers such as N-vinylpyrrolidone, N-vinylpiperidone, N-vinyloxazolidone and the like; (meth)acrylamides such as N-methylacrylamide, N-octylacrylamide, N-phenylmethacrylamide, N-cyclohexylacrylamide, N-phenylethylacrylamide, N-p-methoxy-phenylacrylamide, acrylamide, N,N-dimethylacrylamide, N,N-dibutylacrylamide, N-methyl,N-phenylacrylamide, piperidine acrylate, morpholine acrylate and the like; aromatic substituted ethylene monomers containing nitrogen radicals such as dimethlaminostyrene, diethylaminostyrene, diethylaminomethylstyrene, dioctylaminostyrene and the like; and nitrogen-containing vinylether monomers such as vinyl-N-ethyl-N-phenylaminoethylether, vinyl-N-butyl-N-phenylaminoethylether, triethanolamine divinylether, vinyldiphenylaminoethylether, vinypyrrolizylaminoether, vinyl-.beta.-morpholinoethylether, N-vinylhydroxyethylbenzamide, m-aminophenylvinylether and the like. The polymer should contain at least 1%, at least 2%, at least 5%, at least 8%, at least 10%, or at least 15% on a mole basis of polymerized units in the polymer that contain the nitrogen atom. The nitrogen atom is preferably as part of and amide, amido, amino or amine group, not as a nitro or cyano substituent.

The surface-treatment of colorant pigments can be done by common techniques known in the art of surface-treatment of particles, which include, but are not limit to, solution coating followed by drying, powder coating, precipitation-on-pigment-surface, milling or kneading the pigment in the presence of a nitrogen-containing polymer or copolymer, iontopheresis and "flush" treatment.

The solution coating may be done by dissolving a nitrogen-containing polymer or copolymer in a suitable polar solvent having a Kauri-Butanol number greater than 30. Some examples of solvents for nitrogen-containing polymers or copolymers are tetrahydrofuran, acetone, methyl ethyl ketone, alcohol, water, methanol, and the like. Then the colorant pigment is added and dispersed by high shear mixing, high shear homogenization, ball-milling, attritor milling, high energy bead (sand) milling or other means known in the art for effecting particle size reduction in a dispersion. The input of mechanical energy to the dispersion during miling acts to break down colorant pigment agglomerates into smaller particles. Then the solvent is removed from the colorant pigment dispersion to form treated colorant pigment particles by drying techniques known in the art of drying such as oven, vacuum oven, evaporation, distillation, spray dryer, microwave oven, infrared evaporative systems and the like.

The precipitation-on-pigment-surface can be done by dissolving a nitrogen-containing polymer or copolymer in a suitable polar solvent having a Kauri-Butanol number greater than 30 Then the colorant pigment is added and dispersed by high shear mixing, high shear homogenization, ball-milling, attritor milling, high energy bead (sand) milling or other means known in the art for effecting particle size reduction in a dispersion. Then a non-solvent is added to precipitate the nitrogen-containing polymer or copolymer on the surface of the colorant pigments. The non-solvent can be any liquid in which the nitrogen-containing polymer has a low solubility. The choice of non-solvent depends on the polar solvent and the nitrogen-containing polymer or copolymer.

"Flush treatment" means that an aqueous pigment dispersion is kneaded or otherwise mixed with a resin solution whereby the water which covers each pigment particle is replaced with the resin solution. The flush pigment sample can be dried or used as a dispersion. The resin is a nitrogen-containing polymer or copolymer in this invention.

An electrophotographic liquid toner may be formulated by incorporating a charge control agent into the liquid ink. The charge control agent, also known as a charge director, provides uniform charge polarity of the toner particles. The charge director may be incorporated into the toner particles using a variety of methods, such as chemically reacting the charge director with the toner particle, chemically or physically adsorbing the charge director onto the toner particle (resin or pigment), or chelating the charge director to a functional group such as a stabilizing group, antioxidizing group, charge modification group, solubilizing or insolubilizing or emulsifying groups incorporated into the toner particle. A preferred method is via a functional group built into the graft stabilizer. The charge director acts to impart an electrical charge of selected polarity onto the toner particles. Any number of charge directors described in the art may be used. For example, the charge director may be introduced in the form of metal salts consisting of polyvalent metal ions and organic anions as the counterion. Suitable metal ions include Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). Suitable organic anions include carboxylates or sulfonates derived from aliphatic or aromatic carboxylic or sulfonic acids, preferably aliphatic fatty acids such as stearic acid, behenic acid, neodecanoic acid, diisopropylsalicylic acid, octanoic acid, abietic acid, naphthenic acid, octanoic acid, lauric acid, tallic acid, and the like. Preferred positive charge directors are the metallic carboxylates (soaps) described in U.S. Pat. No. 3,411,936, incorporated herein by reference, which include alkaline earth- and heavy-metallic salts of fatty acids contain at least 6–7 carbons and cyclic aliphatic acids including naphthenic acid; more preferred are polyvalent metal soaps of zirconium and aluminum; most preferred is the zirconium soap of octanoic acid (Zirconium HEX-CEM from Mooney Chemicals, Cleveland, Ohio).

The preferred charge direction levels for a given toner formulation will depend upon a number of factors, including the composition of the graft stabilizer and organosol, the molecular weight of the organosol, the particle size of the organosol, the core/shell ratio of the graft stabilizer, the pigment used in making the toner, and the ratio of organosol to pigment. In addition, preferred charge direction levels will also depend upon the nature of the electrophotographic imaging process, particularly the design of the developing hardware and photoreceptive element. Those skilled in the art, however, know how to adjust the level of charge direction based on the listed parameters to achieve the desired results for their particular application.

The conductivity of a liquid toner has been well established in the art as a measure of the effectiveness of a toner in developing electrophotographic images. The useful conductivity range is from $1.0 \times 10^{-11}$ mho/cm to $10.0 \times 10^{-11}$ mho/cm. High conductivities generally indicate inefficient association of the charges on the toner particles and is seen in the low relationship between current density and toner deposited during development. Low conductivities indicate little or no charging of the toner particles and lead to very low development rates. The use of charge director compounds to ensure sufficient charge associated with each particle is a common practice. There has, in recent times, been a realization that even with the use of charge directors there can be much unwanted charge situated on charged species in solution in the carrier liquid. Such unwanted charge produces inefficiency, instability and inconsistency in the development.

Suitable efforts to localize the charges onto the toner particles and to ensure that there is substantially no migration of charge from those particles into the liquid, and that no other unwanted charge moieties are present in the liquid, give substantial improvements. As a measure of the required properties, we use the ratio between the conductivity of the carrier liquid as it appears in the liquid toner and the conductivity of the liquid toner as a whole (the completely constituted toner dispersion). This ratio should be less than 0.6 preferably less than 0.4 and most preferably less than 0.3. Many prior art toners examined have shown ratios much larger than this, in the region of 0.95.

Any number of methods may be used for effecting particle size reduction of the pigment in preparation of the gel liquid toners. Some suitable methods include high shear homogenization, ball-milling, attritor miling, high energy bead (sand) milling or other means known in the art.

In electrophotography, the electrostatic image is typically formed on a sheet, drum or belt coated with a photoreceptive element by (1) uniformly charging the photoreceptive element with an applied voltage, (2) exposing and discharging portions of the photoreceptive element with a radiation source to form a latent image, (3) applying a toner to the latent image to form a toned image, and (4) transferring the toned image through one or more steps to a final receptor sheet. In some applications, it is sometimes desirable to fix the toned image using a heated pressure roller or other fixing methods known in the art.

While the electrostatic charge of either the toner particles or photoreceptive element may be either positive or negative, electrophotography as employed in the present invention is preferably carried out by dissipating charge on a positively charged photoreceptive element. A positively-charged toner is then applied to the regions in which the positive charge was dissipated using a liquid toner immersion development technique. This development may be accomplished by using a uniform electric field produced by a development electrode spaced near the photoreceptive element surface. A bias voltage is applied to the electrode intermediate to the initially charged surface voltage and the exposed surface voltage level. The voltage is adjusted to obtain the required maximum density level and tone reproduction scale for halftone dots without any background deposited. Liquid toner is then caused to flow between the electrode and the photoreceptive element. The charged toner particles are mobile in the field and are attracted to the discharged areas on the photoreceptive element while being repelled from the undischarged non-image areas. Excess liquid toner remaining on the photoreceptive element is removed by techniques well known in the art. Thereafter, the photoreceptive element surface may be force dried or allowed to dry at ambient conditions.

The quality of liquid inks may be characterized by two parameters: (1) the conductivity of the ink; and (2) the stability of the ink conductivity over time. In the present invention, the high conductivity of the ink at a lower charge director level and its low conductivity variation from lot to lot and from colorant pigment to colorant pigment are unique characteristics of the novel liquid inks which provide high resolution and high speed multi-color images in liquid immersion development electrophotographic processes, particularly, when combined with the inverted dual layer photoconductor.

The substrate for receiving the image from the photoreceptive element can be any commonly used receptor material, such as paper, coated paper, polymeric films and primed or coated polymeric films. Specially coated or treated metal or metallized surfaces may also be used as receptors. Polymeric films include plasticized and compounded polyvinyl chloride (PVC), acrylics, polyurethanes, polyethylene/acrylic acid copolymer, and polyvinyl butyrals. Commercially available composite materials such as those having the trade designations Scotchcal™, Scotchlite™, and Panaflex™ are also suitable for preparing substrates.

The transfer of the formed image from the charged surface to the final receptor or transfer medium may be enhanced by the incorporation of a release-promoting material within the dispersed particles used to form the image. The incorporation of a silicone-containing material or a fluorine-containing material in the outer (shell) layer of the particle facilitates the efficient transfer of the image.

In multicolor imaging, the toners may be applied to the surface of the dielectric element or photoreceptive element in any order, but for colorimetric reasons, bearing in mind the inversion that occurs on transfer, it is sometimes preferred to apply the images in a specified order depending upon the transparency and intensity of the colors. A preferred order for a direct imaging or a double transfer process is yellow, magenta, cyan and black; for a single transfer process, the preferred order is black, cyan, magenta and yellow. Yellow is generally imaged first to avoid contamination from other toners and black is generally imaged last due to the black toner acting as a filter of the radiation source.

In order to function most effectively, liquid inks should have conductance values in the range of 50 to 1200 picomho-cm$^{-1}$. Liquid inks prepared according to the present invention have conductance values of from 100 to 500 picomho-cm$^{-1}$ for a dispersion containing 2.5% by weight solids.

Overcoating of the transferred image may optionally be carried out to protect the image from physical damage and/or actinic damage. Compositions for overcoatings are well known in the art and typically comprise a clear film-forming polymer dissolved or suspended in a volatile solvent. An ultraviolet light-absorbing agent may optionally be added to the coating composition. Lamination of protective layers to the image-beating surface is also well known in the art and may be used with this invention.

These and other aspects of the present invention are demonstrated in the illustrative examples that follow.

EXAMPLES

Glossary of Chemical Abbreviations & Chemical Sources

The following raw materials were used to prepare the polymers in the examples which follow:

The catalysts used in the examples are Azobisisobutyronitrile (designated as AIBN, VAZO™-64 available from DuPont Chemicals, Wilmington, Del.); and Dibutyl Tin Dilaurate (designated as DBTDL, available from Aldrich Chemical Co., Milwaukee, Wis.). The monomers are all available from Scientific Polymer Products, Inc., Ontario, N.Y. unless designated otherwise.

The monomers used in the examples are designated by the following abbreviations: Dimethyl-m-isopropenyl benzyl-isocyanate (TMI, available from CYTEC Industries, West Paterson, N.J.); Ethyl Acrylate (EA); 2-Ethylhexyl Methacrylate (EHMA); 2-Hydroxyethyl Methacrylate (HEMA); and methyl methacrylate (MMA).

Analytical Test Methods

The following test methods were used to characterize the polymers and inks in the examples that follow:

Percent Solids of Graft Stabilizer, Organosol, and Liquid Toner

Percent solids of the graft stabilizer solutions, and the organosol and ink dispersions, were determined gravimetrically using a halogen lamp drying oven attachment to a precision analytical balance (Mettler Instruments Inc., Hightstown, N.J.). Approximately two grams of sample were used in each determination of percent solids using this sample drydown method.

Graft Stabilizer Molecular Weight

Various properties of the graft stabilizer have been determined to be important to the performance of the stabilizer, including molecular weight and molecular weight polydispersity. Graft stabilizer molecular weight is normally expressed in terms of the weight average molecular weight ($M_w$), while molecular weight polydispersity is given by the ratio of the weight average molecular weight to the number average molecular weight ($M_w/M_n$). Molecular weight parameters were determined for graft stabilizers with gel permeation chromatography (GPC) using tetrahydrofuran as the carrier solvent. Absolute $M_w$, was determined using a Dawn DSP-F light scattering detector (Wyatt Technology Corp, Santa Barbara, Calif.), while polydispersity was evaluated by ratioing the measured $M_w$ to a value of $M_n$, determined with an Optilab 903 differential refractometer detector (Wyatt Technology Corp, Santa Barbara, Calif.).

Liquid Toner Properties

The characterization of a liquid toner requires the measurement of a number of physical and chemical properties of the toner, as well as direct evaluation of image quality obtained by developing the toner in a LEP imaging mechanism. The measured toner characteristics can be roughly broken down into size-related properties (particle size), charge-related properties (bulk and free phase conductivity, dynamic mobility and zeta potential).

Particle Size

Toner particle size distributions were determined using a Horiba LA-900 laser diffraction particle size analyzer (Horiba Instruments, Inc, Irvine, Calif.). Toner samples were diluted approximately 1/500 by volume and sonicated for one minute at 150 watts and 20 kHz prior to measurement. Toner particle size was expressed on a number-average basis in order to provide an indication of the fundamental (primary) particle size of the ink particles.

Toner Conductivity

The liquid toner conductivity (bulk conductivity, $k_b$) was determined at approximately 18 Hz using a Scientifica model 627 conductivity meter (Scientifica Instruments, Inc., Princeton, N.J.). In addition, the free (dispersant) phase conductivity ($k_f$) in the absence of toner particles was also determined. Toner particles were removed from the liquid milieu by centrifugation at 5° C. for 1–2 hours at 6,000 rpm (6,110 relative centrifugal force) in a Jouan MR1822 centrifuge (Winchester, Va.). The supernatant liquid was then carefully decanted, and the conductivity of this liquid was measured using a Scientifica Model 627 conductance meter. The percentage of free phase conductivity relative to the bulk toner conductivity was then determined as: 100% ($k_f/K_b$).

Particle Mobility

Toner particle electrophoretic mobility (dynamic mobility) was measured using a Matec MBS-8000 Electrokinetic Sonic Amplitude Analyzer (Matec Applied Sciences, Inc., Hopkinton, Mass.). Unlike electrokinetic measurements based upon microelectrophoresis, the MBS-8000 instrument has the advantage of requiring no dilution of the toner sample in order to obtain the mobility value. Thus, it was possible to measure toner particle dynamic mobility at solids concentrations actually preferred in printing. The MBS-8000 measures the response of charged particles to high frequency (1.2 MHz) alternating (AC) electric fields. In a high frequency AC electric field, the relative motion between charged toner particles and the surrounding dispersion medium (including counter-ions) generates an ultrasonic wave at the same frequency of the applied electric field. The amplitude of this ultrasonic wave at 1.2 MHz can be measured using a piezoelectric quartz transducer; this electrokinetic sonic amplitude (ESA) is directly proportional to the low field AC electrophoretic mobility of the particles. The particle zeta potential can then be computed by the instrument from the measured dynamic mobility and the known toner particle size, dispersant liquid viscosity, and liquid dielectric constant.

Organosol

To a 5000 ml 3-necked round bottom flask equipped with a condenser, a thermocouple connected to a digital temperature controller, a nitrogen inlet tube connected to a source of dry nitrogen, and an overhead mechanical agitator, was charged with a mixture of NORPAR™ 12 (2561 g), EHMA (849 g), 96% HEMA (26.8 g), and of AIBN (8.31 g). While mechanically stirring the mixture, the reaction flask was purged with dry nitrogen for 30 minutes at a flow rate of approximately 2 liters/min. A hollow glass stopper was then inserted into the open end of the condenser and the nitrogen flow rate was reduced to approximately 0.5 liters/min. The mixture was heated to 70° C. for 16 hours, at which time the conversion was quantitative.

The mixture was heated to 90° C. and held at that temperature for 1 hour to destroy any residual AIBN, then was cooled back to 70° C. The nitrogen inlet tube was then removed, and 13.6 g of DBTDL were added to the mixture, followed by 41.1 g of TMI. The TMI was added drop wise over the course of approximately five minutes while magnetically stirring the reaction mixture. The nitrogen inlet tube was replaced, the hollow glass stopper in the condenser was removed, and the reaction flask was purged with dry nitrogen for 30 minutes at a flow rate of approximately 2 liters/min. The hollow glass stopper was reinserted into the open end of the condenser and the nitrogen flow rate was reduced to approximately 0.5 liters/min. The mixture was allowed to react at 70° C. for 6 hours, at which time the conversion was quantitative.

The mixture was then cooled to room temperature. The product is a copolymer of EHMA and HEMA having random side chains of TMI and is designated as EHMA/EMA-TMI (97/3–4.7% w/w).

The copolymer above was used to prepare an organosol with a core/shell ratio of 8/1. To a 5000 mL 3-necked round bottom flask equipped with an overhead mechanical stirrer, condenser, a thermocouple connected to a digital temperature controller, and a nitrogen inlet tube connected to a source of dry nitrogen was charged with a mixture of NORPAR™ 12 (2943 g), the copolymer above (179.5 g, 26.0% solids), MMA (93.3 g), EA (280 g), and AIBN (6.3 g). While mechanically stirring, the reaction flask was purged with dry nitrogen for 30 minutes at a flow rate of approximately 2 liters/minute. The nitrogen flow rate was then adjusted to approximately 0.5 liters/min. The mixture was heated to 70° C. with stirring, and allowed to polymerize at 70° C. for 16 hours, at which time the organosol was cooled to room temperature.

Approximately 350 g of n-heptane were added to the cooled organosol and the resulting mixture was stripped of residual monomer using a rotary evaporator equipped with a dry ice/acetone condenser and operating at a temperature of 95° C., and reducing the vacuum gradually so as to maintain an adequate condensate collection rate to approximately 15 mm Hg. The stripped organosol was cooled to room temperature, yielding an opaque white dispersion.

This organosol is designated EHMA/HEMA-TMI///MMA/EA (97/3-4.7//25/75% w/w) having a calculated core $T_g$ equal to $-1°$ C. DSC (differential scanning calorimetry) showed the measured Tg to be 5.7° C. The percent solids of this organosol was determined as 20.24% solids using the halogen drying method outlined above.

Liquid Toner Examples

Comparative Example A

An organosol/charge control additive/Norpar premix was prepared by adding Zr Hexcem solution (14.20 g, 6.15 weight percent, commercially obtained from OMG Americas, Inc., Westlake, Ohio) and Norpar 12 (951.8 g) to organosol EHMA/HEMA-TMI//MMA/EA (1034.0 g) and shaking the mixture on a laboratory shaker for approximately 30 minutes. A 0.5 L Igarashi cell was charged with 390 g of Potter's Glass beads, 294.9 g of the organosol/charge control additive/Norpar premix, and 5.14 g of untreated Monarch 120 (lot 485–732, commercially obtained from Carbot, Billerica, N.Y.) was used in place of the treated pigment. The composition was milled for 90 minutes at 2000 rpm to give a black ink with a charge control additive (CCA) level equal to 25 mg CCA/g of pigment.

The particles size and conductivity of the black ink was measured according to procedures described previously. The results showed that the conductivity of 3 weight percent black ink was 105 pmho/cr, free phase conductivity was 1.42 pmho/cm (1.35% free phase conductivity), and the volume average particle size (Horiba 910) was 0.84 microns. The particle size distribution was mono-modal with a maximum at approximately 1.20 microns. The toner printed satisfactorily with slight background development and reflected optical density=1.49 at 500V developer bias.

Example 1

Carbon black pigment (20.0 g, Monarch 120, lot 485-732, commercially obtained from Carbot, Billerica, N.Y.) and denatured ethanol (60.0 g) were placed in a 400 mL polyethylene beaker. The mixture was homogenized using a Polytron laboratory disperser (Model # PT 10/35, commercially obtained from Kinematica, Littau, Switzerland) for about 3 minutes to give a viscous paste. Poly(2-vinylpyridine-co-styrene) solution in denatured alcohol (20.0 g of a 2.5 weight percent solution, $M_{mw}$= approximately 220,000 (here, number average molecular weight was used, although weight average molecular weight would be an appropriate basis), 30% styrene content, commercially obtained from Aldrich Chemical Company, Milwaukee, Wis.) was added to the carbon black dispersion. The homogenization was continued until a low viscosity black dispersion was obtained. An additional 60.0 g of 2.5 wt % poly(2-vinylpyridine-co-styrene) was added to the dispersion and the homogenization was continued for approximately ten minutes on setting number 5. The weight ratio of pigment to polymer is 10/1. The black dispersion was poured as a thin stream into 2600 g of deionized water stirred with a laboratory stirrer. The pigment suspension in water was filtered through a filter paper (Whatman #54) and washed with two approximately 150 g portions of deionized water. The collected pigment was dried at 50° C. for approximately 20 hours and then ground by hand in a laboratory mortar and pestle to give poly(2-vinylpyridine-co-styrene) treated Monarch 120 pigment.

An organosol/charge control additive/Norpar® premix was prepared by adding Zr Hexcem solution (14.20 g, 6.15 weight percent, commercially obtained from OMG Americas, Inc., Westlake, Ohio) and Norpar® 12 (951.8 g) to organosol EHMA/HEMA-TMI///MMA/EA (1034.0 g) and shaking the mixture on a laboratory shaker for approximately 30 minutes. A 0.5 L Igarashi cell was charged with 390 g of Potter's Glass beads, 294.9 g of the organosol/charge control additive Norpar® premix, and 5.65 g of the poly(2-vinylpyridine-co-styrene) treated Monarch 120 pigment. The composition was milled for 90 minutes at 2000 rpm to give a black ink with a charge control additive (CCA) level equal to 25 mg CCA/g of pigment without poly(2-vinylpyridine-co-styrene)).

The particles size and conductivity of the black ink was measured according to procedures described previously. The results showed that the conductivity of 3 weight percent black ink was 185 pmho/cm, free phase conductivity was 9.71 pmho/cm (5.2% free phase conductivity), and the volume average particle size (Horiba 910) was 2.56 microns. The particle size distribution was bi-modal with maxima at approximately 1.25 microns and 4 microns (shoulder, approximately 30 volume percent of toner). The toner printed satisfactorily with reflected optical density=1.44 at 500V developer bias.

This experiment shows that treating carbon black pigment with poly(2-vinylpyridine-co-styrene) is effective to improve the chargeability of the pigment to provide an ink with conductivity greater than 135 pmho and CCA level equal to 25 mg CCA/g of pigment.

Example 2

Carbon black pigment (20.0 g, Monarch 120, lot 485-732, commercially obtained from Carbot, Billerica, N.Y.) and denatured ethanol (60.0 g), and poly(2-vinylpyridine-co-butyl methacrylate) (approximately 60 g of 2.5 weight percent solution, 10% butyl methacrylate content, commercially obtained from Aldrich Chemical Company, Milwaukee, Wis.) were placed in a 400 mL polyethylene beaker. The mixture was homogenized using a Polytron laboratory disperser (Model # PT 10/35, commercially obtained from Kinematica, Littau, Switzerland) for about 3 minutes to give a carbon black dispersion. Additional poly(2-vinylpyridine-co-butyl methacrylate) solution (100.0 g of 2.5 weight percent in denatured ethanol) was added to the dispersion and the homogenization was continued for approximately ten minutes on setting number 5. The weight ratio of pigment to polymer is 5/1. The black dispersion was poured as a thin stream into 2200 g of deionized water stirred with a laboratory stirrer. The pigment suspension in water was filtered through a filter paper (Whatman #54) and washed with two approximately 150 g portions of deionized water. The collected pigment was dried at 50° C. for approximately 20 hours and then ground by hand in a laboratory mortar and pestle to give poly(2-vinylpyridine-co-butyl methacrylate) treated Monarch 120 pigment.

An organosol/charge control additive/Norpar® premix was prepared by adding Zr Hexcem solution (14.20 g, 6.15 weight percent, commercially obtained from OMG Americas, Inc., Westlake, Ohio) and Norpar® 12 (951.8 g) to organosol EHMA/HEMA-TMI///MMA/EA (1034.0 g) and shaking the mixture on a laboratory shaker for approximately 30 minutes. A 0.5 L Igarashi cell was charged with 390 g of Potter's Glass beads, 294.9 g of the organosol/charge control additive/Norpar® premix, and 6.16g of the poly(2-vinylpyridine-co-butyl methacrylate) treated Monarch 120 pigment. The composition was milled for 90 minutes at 2000 rpm to give a black ink with a charge control additive (CCA) level equal to 25 mg CCA/g of pigment without poly(2-vinylpyridine-co-butyl methacrylate).

The particles size and conductivity of the black ink was measured according to procedures described previously. The results showed that the conductivity of 3 weight percent black ink was 233 pmho/cm, free phase conductivity was 11.74 pmho/cm (5.0% free phase conductivity), and the volume average particle size (Horiba 910) was 11.0 microns. The particle size distribution was bi-modal with maxima at approximately 13 microns (about 85 weight percent) and 1.5 microns (about 15 weight percent). The procedure of treating carbon black pigment with poly(2-vinylpyridine-co-butyl methacrylate) is also effective to raise the toner particle size distribution.

This experiment shows that treating carbon black pigment with poly(4-vinylpyridine-co-butyl methacrylate) is effective to improve the chargeability of the pigment to provide an ink with conductivity greater than 135 pmho and CCA level equal to 25 mg CCA/g of pigment.

Example 3

Poly(1-vinylpyrrolidone-co-2-dimethylaminoethylmethacrylate) solution in water (10.0 g of 19 weight percent solution, average Mw=1,000,000, commercially obtained from Aldrich Chemical Company, Milwaukee, Wis.) was charged to a 400 mL beaker and 190 g of boiling deionized water added to give a hot, dilute solution of polymer. The hot solution was poured onto carbon black pigment (20.0 g, Monarch 120, lot 485-732, commercially obtained from Carbot, Billerica, N.Y.) and the mixture was stirred with a magnetic laboratory stirrer for 10 minutes. The resulting slurry was filtered through a filter paper (Whatman #5) to reduce the volume to approximately 100 mL. At this point, the filtration was very slow and the mass retained on the filter was observed to be a black thixotropic gelatinous mass. The retentate was placed in an oven at 50 C for 7 days to dry and then ground by hand using a mortar and pestle to give poly(1-vinylpyrrolidone-co-2-dimethylaminoethylmethacrylate) treated carbon black pigment.

An organosol/charge control additive/Norpar® premix was prepared by adding Zr Hexcem solution (14.20 g, 6.15 weight percent, commercially obtained from OMG Americas, Inc., Westlake, Ohio) and Norpar®12 (951.8 g) to organosol EHMA/HEMA-TMI///MMA/EA (1034.0 g) and shaking the mixture on a laboratory shaker for approximately 30 minutes. A 0.5 L Igarashi cell was charged with 390 g of Potter's Glass beads, 294.9 g of the organosol/ charge control additive/Norpar premix, and 5.14 g of the poly(2-vinylpyridine-co-butyl methacrylate) treated Monarch 120 pigment. The composition was milled for 90 minutes at 2000 rpm to give a black ink with a charge control additive (CCA) level equal to 25 mg CCA/g of pigment without poly(2-vinylpyridine-co-butyl methacrylate).

The particles size and conductivity of the black ink was measured according to procedures described previously. The results showed that the conductivity of 3 weight percent black ink was 167 pmho/cm, free phase conductivity was 7.11 pmho/cm (4.3% free phase conductivity), and the volume average particle size (Horiba 910) was 5.291 microns. The particle size distribution was bi-modal with maxima at approximately 1.3 microns (approximately 40 volume percent of toner) and 8.5 microns (approximately 60 volume percent of toner). The toner printed satisfactorily with reflected optical density=1.29 at 500V developer bias.

This experiment shows that treating carbon black pigment with poly(1-vinyl pyrrolidone-co-2-dimethylaminoethylmethacrylate) is effective to improve the chargeability of the pigment to provide an ink with conductivity greater than 135 pmho and CCA level equal to 25 mg CCA/g of pigment.

Example 4

Carbon black pigment (20.0 g, Monarch 120, lot 485-732, commercially obtained from Carbot, Billerica, N.Y.) was added to 100 g of poly(vinyl pyrrolidone-co-vinyl acetate) solution (PVP/VA E-335, 0.67 weight percent solution in denatured alcohol, commercially obtained from ISP Technologies, Inc., Wayne, N.J.). The mixture was homogenized using a Polytron laboratory disperser for about 10 minutes to give a black dispersion. The weight ratio of pigment to polymer is 30/1. The black dispersion was poured into an aluminum pan and dried at 80° C. for approximately 20 hours and then ground by hand in a laboratory mortar and pestle to give poly(vinyl pyrrolidone-co-vinyl acetate) treated Monarch 120 pigment. An organosol/charge control additive/Norpar premix was prepared by adding Zr Hexcem solution (14.20 g, 6.15 weight percent, commercially obtained from OMG Americas, Inc., Westlake, Ohio) and Norpar 12 (951.8 g) to organosol EHMA/HEMA-TMI///MMA/EA (1034.0 g) and shaking the mixture on a laboratory shaker for approximately 30 minutes. A 0.5 L Igarashi cell was charged with 390 g of Potter's Glass beads, 294.9 g of the organosol/charge control additive/Norpar premix, and 5.31 g of the poly(vinyl pyrrolidone-co-vinyl acetate) treated Monarch 120 pigment. The composition was milled for 90 minutes at 2000 rpm to give a black ink with a charge control additive (CCA) level equal to 25 mg CCA/g of pigment without poly(vinyl pyrrolidone-co-vinyl acetate).

The particles size and conductivity of the black ink was measured according to procedures described previously. The results showed that the conductivity of 3 weight percent black ink was 145 pmho/cm, the free phase conductivity was 6.77 pmho/cm (4.7% free phase conductivity), and the volume average particle size (Horiba 910) was 1.04 microns. The particle size distribution was mono-modal.

This experiment shows that treating carbon black pigment with poly(vinyl pyrrolidone-co-vinyl acetate) is effective to improve the chargeability of the pigment to provide an ink with conductivity greater than 135 pmho and CCA level equal to 25 mg CCA/g of pigment. This example also demonstrates that treating carbon black pigment to improve conductivity does not increase the size of the toner particles relative to an untreated control black pigment when milled under conditions as set forth above.

Example 5

To a 500 mL clear glass bottle was charged with 210 g toluene, 72.0 g styrene (product of Aldrich Chemical Company, Milwaukee, Wis), 28.0 g dimethylaminoethyl methacrylate (commercially obtained from Aldrich Chemical Company, Milwaukee, Wis.) and 1.35g of 2,2'-azobisisobutyronitrile (AIBN, commercially obtained from Aldrich Chemical Company, Milwaukee, Wis.). The resulting solution was purged with nitrogen for 10 minutes then placed in a tumbler with a heated water bath (Launder-o-meter, commercially obtained from Atlas Electric Products, Chicago Ill.) with the bath temperature set to 70° C. The mixture was allowed to react at 70° C. while tumbling for a period of 16 hours, then was removed and cooled to room temperature. An additional 72.0 g of styrene, 28.0 g of dimethylaminoethyl methacrylate and 1.35 g of AIBN were added to the bottle, which was again purged with nitrogen and tumbled at 70° C. for 20 hours. The resulting polymer solution in toluene was poured into heptane (approximately 3500 mL) to give a precipitate in the form of an opaque viscous liquid with a consistency like paste. The heptane was decanted from the precipitated polymer and the polymer was allowed to dry in a vented oven for 2 days. The dried, glassy polymer was dissolved in toluene and precipitated a second time, followed by decanting and drying to give a glassy solid product of poly(styrene-co-dimethylaminoethyl methacrylate) with calculated styrene/dimethylaminoethyl methacrylate mole ratio=8/2.

Then, carbon black pigment (20.0 g, Cabot Monarch 120, lot 485-732, commercially obtained from Carbot, Billerica, N.Y.) was added to 100 g of 2.0 weight percent solution of poly(styrene-co-dimethylaminoethyl methacrylate) solution in acetone. The mixture was homogenized using a Polytron laboratory disperser for about 10 minutes to give a black dispersion. The weight ratio of pigment to polymer is 10/1. The black dispersion was poured as a thin stream into 2600 g of deionized water stirred with a laboratory stirrer and stirring was continued for 30 minutes. The pigment suspension in water was filtered through a filter paper (Whatman #54) and washed with two approximately 150 g portions of deionized water. The collected pigment was dried at 80° C. for approximately 20 hours and then ground by hand in a laboratory mortar and pestle to give a poly(styrene-co-dimethylaminoethyl methacrylate) treated Monarch 120 pigment.

An organosol/charge control additive/Norpar premix was prepared by adding Zr Hexcem solution (14.20 g, 6.15 weight percent, commercially obtained from OMG Americas, Inc., Westlake, Ohio) and Norpar® 12 (951.8 g) to organosol EHMA/HEMA-TMI///MMA/EA (1034.0 g) and shaking the mixture on a laboratory shaker for approximately 30 minutes. A 0.5 L Igarashi cell was charged with 390 g of Potter's Glass beads, 294.9 g of the organosol/ charge control additive/Norpar® premix, and 5.65 g of the poly(styrene-co-dimethylaminoethyl methacrylate) treated Monarch 120 pigment. The composition was milled for 90 minutes at 2000 rpm to give a black ink with a charge control additive (CCA) level equal to 25 mg CCA/g of pigment without poly(styrene-co-dimethylaminoethyl methacrylate).

The particles size and conductivity of the black ink was measured according to procedures described previously. The results showed that the conductivity of 3 weight percent black ink was 135 pmho/cm, free phase conductivity was 5.12 pmho/cm (3.8% free phase conductivity), and the volume average particle size (Horiba 910) was 0.86 microns. The particle size distribution was mono-modal.

This experiment shows that treating carbon black pigment with poly(styrene-co-dimethylaminoethyl methacrylate) is effective to improve the chargeability of the pigment to provide an ink with conductivity greater than 135 pmho and CCA level equal to 25 mg CCA/g of pigment. This example also demonstrates that treating carbon black pigment to improve conductivity does not increase the size of the toner particles relative to an untreated control black pigment when milled under conditions as set forth above.

A number of embodiments of the invention have been described. Nevertheless, it will be understood that various modifications may be made without departing from the spirit and scope of the invention. Accordingly, other embodiments are within the scope of the following claims.

What is claimed is:

1. A process of making a liquid ink comprising the steps of:
   (a) dissolving a first polymer comprising units derived from at least a nitrogen-containing polymerizable monomer in a solvent with a Kauri-Butanol number greater than 30 to form a polymer solution, wherein said nitrogen atom is present in a functional group selected from the group consisting of amine groups;
   (b) dispersing colorant pigment particles in said polymer solution to form a colorant pigment dispersion;
   (c) removing at least some of said solvent from said colorant pigment dispersion to form treated colorant pigment particles with an outer layer of the first polymer; and
   (d) dispersing said treated colorant pigment particles in an organosol containing a second polymer carried in a carrier liquid having a Kauri-Butanol number less than 30.

2. A process of making a liquid ink according to claim 1 wherein the dispersion resulting from step b) further comprises a change director.

3. A process of making a liquid ink according to claim 1 wherein said nitrogen-containing polymerizable monomer is selected from the group consisting of methacrylates or acrylates having aliphatic amino radicals, nitrogen containing heterocyclic vinyl monomers, aromatic substituted ethylene monomers containing nitrogen radicals, and nitrogen-containing vinylether monomers.

4. A process of making a liquid ink according to claim 1 wherein the colorant pigment is carbon black.

5. A process of making a liquid ink comprising the steps of:
   (a) dissolving a first polymer comprising units derived from at least a nitrogen-containing polymerizable monomer in a solvent with a Kauri-Butanol number greater than 30 to form a polymer solution, wherein said nitrogen atom is present in a group selected from the group consisting of amine groups;
   (b) dispersing colorant pigment particles in said polymer solution to form a colorant pigment dispersion;
   (c) precipitating treated colorant pigment particles from said colorant pigment dispersion, the treated colorant pigment comprising pigment with said first polymer precipitated thereon; and
   (d) dispersing said treated colorant pigment particles in an organosol containing a second polymer suspended in a carrier liquid having a Kauri-Butanol number less than 30.

6. A process of making a liquid ink according to claim 5 wherein the dispersion formed in step b) further comprises a charge director.

7. A process of making a liquid ink according to claim 5 wherein the colorant pigment is carbon black.

* * * * *